(No Model.)
E. COOK.
FIRE KINDLER.
No. 577,722. Patented Feb. 23, 1897.
Fig. I.
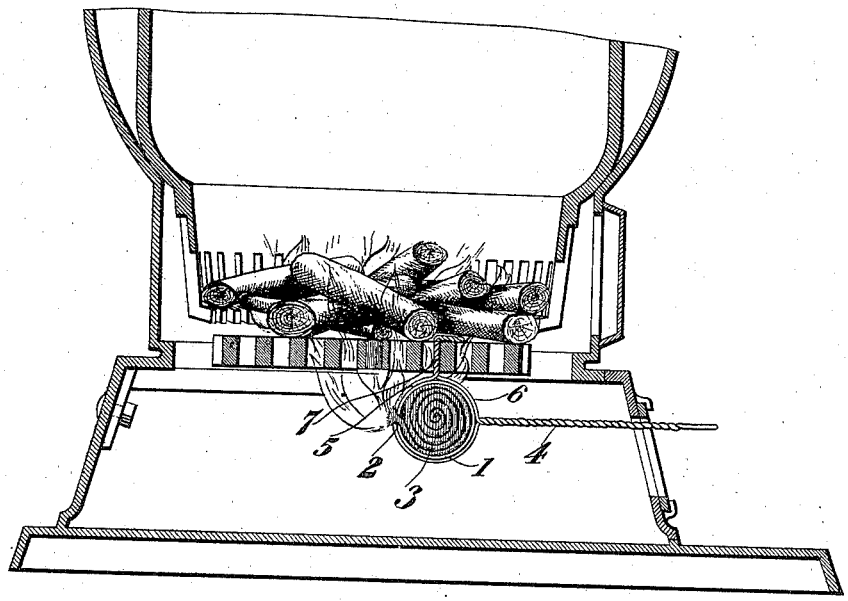
Fig. II.
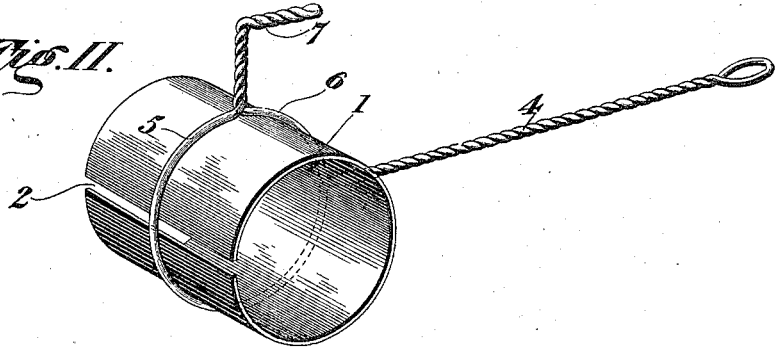
Witnesses
M. C. Fowler
S. N. Acker
Inventor
Ellsworth Cook
By Joseph F. Atkins
Attorney

UNITED STATES PATENT OFFICE.

ELSWORTH COOK, OF KEMPTON, ILLINOIS.

FIRE-KINDLER.

SPECIFICATION forming part of Letters Patent No. 577,722, dated February 23, 1897.

Application filed June 1, 1896. Serial No. 593,840. (No model.)

*To all whom it may concern:*

Be it known that I, ELSWORTH COOK, of Kempton, Ford county, State of Illinois, have invented certain new and useful Improvements in Fire-Kindlers, of which the following is a specification, reference being had to the accompanying drawings.

The object of my invention is to produce a handy utensil consisting, substantially, of a safe and durable reservoir for oil or other liquid combustible and of means for applying it to a grate or like receptacle for fuel in order to induce initial combustion.

In the accompanying drawings, Figure I is a side elevation of my kindler as attached to a grate. Fig. II is an end view thereof, looking toward the slot in the casing and showing the absorbent material removed.

Referring to the figures on the drawings, 1 indicates the reservoir shell or casing of my kindler. It preferably consists of an oblong open-ended cylindrical sheet provided in the side with a slot or longitudinal opening 2. The shell may be formed of ordinary sheet metal and the slot may consist of an opening between the opposite edges of the same. The interior of the shell is filled with a mass of non-combustible material, preferably of rolled sheet asbestos 3, a portion of which extends through the slot, forming, in effect, a projecting wick. Upon one side of the shell and extending at right angles to its longitudinal axis I provide a handle 4. I prefer to make the handle of twisted wire, as illustrated, whose ends 5 and 6, passing around the exterior of the shell, are united upon the side thereof and twisted together to form, as means for securing the kindler to a grate or the like, a hook 7, preferably opening toward the handle. By this means the metallic part of my kindler may be made to consist of two members, the shell and the wire twisted to form the handle, wrapped around the shell and twisted to form the hook 7. This construction is preferable not only on account of its simplicity, but as affording in its twisted parts cheap and ready means for securing the shell with suitable compression upon the absorbent material contained within it.

In practice the shell containing the absorbent material having been immersed in a suitable combustible liquid absorbs a quantity of the same and supplies it through capillary attraction to the wick 4, where it may be ignited. The heat of the flame upon the wick serves to generate gas from the interior of the asbestos, which, issuing from the ends of the shell, takes fire and supplies the brisk hot flame desirable for kindling purposes.

The hook 7 is designed to support the kindler in proximity to the fuel to be kindled, and on account of its shape and arrangement with respect to the handle is especially adapted for holding the kindler with requisite stability upon a grate or the like.

What I claim is—

A fire-kindler consisting of a compressible shell and a slot therein, a mass of non-combustible absorbent material within the shell, and having a portion thereof extending through the slot to form a wick, and a handle of twisted wire having its ends encircling the shell, united upon the side thereof and formed into a hook adapted to support the kindler upon the grate, substantially as specified.

In testimony of all which I have hereunto subscribed my name.

ELSWORTH COOK.

Witnesses:
   J. R. STUART,
   CHAS. DEMOSS.